US007649882B2

(12) United States Patent
Stiliadis

(10) Patent No.: US 7,649,882 B2
(45) Date of Patent: Jan. 19, 2010

(54) MULTICAST SCHEDULING AND REPLICATION IN SWITCHES

(75) Inventor: Dimitrios Stiliadis, Matawan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1051 days.

(21) Appl. No.: 10/402,589

(22) Filed: Mar. 28, 2003

(65) Prior Publication Data

US 2004/0008716 A1 Jan. 15, 2004

Related U.S. Application Data

(60) Provisional application No. 60/395,906, filed on Jul. 15, 2002.

(51) Int. Cl.
*H04L 12/56* (2006.01)
*H04J 3/24* (2006.01)

(52) U.S. Cl. .................. 370/390; 370/395.41; 370/412; 370/428; 370/468

(58) Field of Classification Search ........................ None
See application file for complete search history.

(56) References Cited

U.S. PATENT DOCUMENTS

| 5,636,210 | A | * | 6/1997 | Agrawal ...................... 370/390 |
| 5,689,506 | A | * | 11/1997 | Chiussi et al. .............. 370/388 |
| 6,088,333 | A | * | 7/2000 | Yang et al. .................. 370/238 |
| 6,192,417 | B1 | * | 2/2001 | Block et al. ................. 709/249 |
| 6,219,352 | B1 | * | 4/2001 | Bonomi et al. .............. 370/417 |
| 6,430,153 | B1 | * | 8/2002 | Hughes et al. ........... 370/230.1 |
| 6,754,222 | B1 | * | 6/2004 | Joung et al. ................. 370/412 |
| 6,831,892 | B2 | * | 12/2004 | Robinett et al. ............. 370/232 |
| 6,850,522 | B2 | * | 2/2005 | Hasegawa et al. ........... 370/390 |
| 6,856,595 | B1 | * | 2/2005 | Brown ........................ 370/229 |
| 6,977,941 | B2 | * | 12/2005 | Takahashi et al. ........... 370/412 |
| 7,006,495 | B2 | * | 2/2006 | Hooper ....................... 370/389 |
| 7,184,440 | B1 | * | 2/2007 | Sterne et al. ........... 370/395.52 |
| 7,236,489 | B1 | * | 6/2007 | Wyatt .......................... 370/392 |
| 7,337,231 | B1 | * | 2/2008 | Li .............................. 709/231 |
| 7,420,972 | B1 | * | 9/2008 | Woo et al. ................... 370/390 |
| 2001/0048662 | A1 | * | 12/2001 | Suzuki et al. ............... 370/230 |
| 2008/0056275 | A1 | * | 3/2008 | Smiljanic ............... 370/395.41 |

\* cited by examiner

*Primary Examiner*—Gregory B Sefcheck
(74) *Attorney, Agent, or Firm*—Mendelsohn, Drucker and Associates, P.C.

(57) ABSTRACT

A communications switch or router employs a replication server to perform batch processing of multicast connections. The replication server performs three distinct forms of processing using staging queues: packet arrival processing, packet replication processing, and per-interface transmission processing. Packet arrival processing queues arriving packets in session queues, adds new multicast sessions to a replication set, and assigns a counter equivalent to the fan-out of the multicast session. Packet replication processing assigns a descriptor to packets of each session in the replication set, and copies the descriptor to each per-interface queue. Per-interface transmission processing examines each descriptor in the per-interface queue, copies the corresponding packets for transmission by the interface, adjusts the counter as each packet is copied, and clears the packet in the switch based on the adjusted counter.

16 Claims, 5 Drawing Sheets

MULTICAST SCHEDULING AND REPLICATION IN SWITCHES

CROSS-REFERENCE TO RELATED APPLICATIONS

This application claims the benefit of the filing date of U.S. provisional application No. 60/395,906 filed on Jul. 15, 2002.

BACKGROUND OF THE INVENTION

1. Field of the Invention

The present invention relates to routing connections in a telecommunications network, and, more particularly, to scheduling and replication of packets for multicast connections.

2. Description of the Related Art

Broadband access technologies, such as cable modem, passive optical network (PON), and DSL, enable service providers to distribute multimedia content over data networks. Some of the applications offered by service providers, such as broadband video and interactive gaming, require multicast distribution of content from a source (the service provider, generally connected to a backbone network) to multiple destinations (end users, generally connected through an access network). For these applications, several hundreds of end users may be served, and so the content must be delivered at low cost to the network. Cost may be measured in a number of ways, such as node delay/congestion, processing/memory requirements, or complexity.

Because access packet networks support many broadband technologies, the multicast distribution of content requires efficient support of multicast connections in switches and routers that receive the content and transfer the content to the access packet network. For example, a router in a network may receive broadcast video from a satellite, and then multicast this content to a number of users connected to the network. These switches and routers are sometimes referred to as edge switches and edge routers. For the following description, the term "switch" is used, but the description applies equally to routers.

In general, an edge switch includes a set of line cards that are interconnected through a switching fabric. Line cards both receive data and transmit data, and support the line format, or the physical and lower layers, of the transmission medium (e.g., OC-1 or OC-3 optical links transferring data in accordance with SONET or ATM standards). Some line cards may be connected to other packet networks, satellite links, or similar types of communications networks that provide the content, and other line cards may be connected to the access network to provide connectivity to end users through point-to-point connections. If content is received at the line card, this interface is referred to as an ingress port of the edge switch. If content is provided from the line card, this interface is referred to as an egress port of the edge switch.

For a multicast connection to two or more end users, a multicast session comprises a stream of packets (or "packet flow"). The packet flow from the content provider is received at an ingress port of the edge switch. To generate a packet flow from the edge switch to each end user that is to receive the multicast content, the edge switch duplicates each packet of the packet flow. Each multicast packet is separately addressed for a corresponding egress port. The egress logic, termed a traffic manager, replicates the packet into multicast packets, queues each multicast packet, and delivers each multicast packet to a corresponding egress port. The number of egress ports that packets of a multicast session are replicated for is referred to as the fan-out of the session.

Replicating packets, either through pointer manipulation or actual copying, is an expensive process in terms of processing cycles and/or memory bandwidth used. The process of replicating packets must eventually copy each packet to a potentially large number of queues, which process is usually completed at "wire-speed" (i.e., with a continuous stream of packets at the smallest size, the multicasting process should be completed without delay). Satisfying the wire-speed requirement translates to a corresponding speed-up requirement from the memory that is on the order of the number of egress ports.

To satisfy the wire-speed requirement, the traffic manager should have enough memory bandwidth available to write and read all packets to and from the memory. In addition, the traffic manager should be able to efficiently process the data structures that are employed to maintain the queues. Since each egress port may support different levels of quality-of-service (QoS) provisioning, and since each switch typically includes a large number of egress ports, the total number of queues that must be maintained by the data structure and that must be supported by the traffic manager is very large. Consequently, queues are implemented as virtual queues using linked-lists, and, if variable-sized packets are stored in terms of linked-lists of constant size buffers, the queues may be implemented using linked-lists of buffers. Maintaining linked-lists also places a high demand on the memory bandwidth. Finally, to satisfy the wire-speed requirement, the traffic manager should be able to process arbitrarily long streams of minimum-sized packets.

Any single multicast-session packet might be added into several queues and/or read several times from the memory during the process of replicating the packet. Although the actual packet might be stored only once in the memory, several data structures may be updated. Several methods are employed in the prior art to implement the replication process for multicasting: maximum speed-up, staging buffers, and dedicated multicast queues.

The maximum speed-up method is commonly known as the replication-at-receiving (RAR) method. To replicate a packet in the RAR method, a packet is stored in the memory only once, and a descriptor of the packet is added to all the per-interface queues that the packet must be transmitted to. A per-interface queue is a separate queue associated with a particular egress port. The RAR method minimizes memory bandwidth for storing packets, but increases the control memory bandwidth in order to add a descriptor of each incoming packet to all outgoing queues. When fan-out is large, the RAR method becomes impractical. A given implementation of the RAR method has a memory speed-up that is determined by a worst-case processing scenario. Consequently, most of the available memory bandwidth remains unused most of the time. If less than the total worst-case memory speed-up is used, certain traffic patterns may occur that result in packet dropping when back-to-back packets must be transmitted to a large number of egress ports at a rate greater than the available speed-up. Packet dropping occurs since the second packet arrives before completing insertion of the first packet into all the egress port queues.

When staging buffers are employed, multicast packets are separated from unicast traffic and placed in a separate queue, or staging buffer, on arrival. The traffic manager replicates packets to per-interface queues using some level of speed-up, but not the full memory speed-up dictated by the worst-case scenario. While this provides some protection from packet dropping, especially for the back-to-back packet-arrival case, other traffic patterns may cause unstable operation if the rate of multicast processing is less than (the arrival rate of multicast packets) times (the fan-out). Accurate design of the staging buffers might not be possible unless traffic pattern characteristics are well known (e.g., unless burst lengths of connections applied to the switch are known a priori).

An alternative approach to the RAR method and staging buffers employs dedicated multicast queues and is known as the replication-at-send (RAS) method. Multicast packets are queued independently in one or more dedicated multicast queues, and packets destined for different egress ports might be buffered together in the same queue. Each multicast queue is visited periodically, the first packet of the multicast queue is read, and the packet replicated across all egress ports on the fly. Consequently, multicast packets are not queued on a per-interface queue basis.

For the RAS method, each egress port typically consumes (transmits) packets at a rate that is much less than the rate at which the traffic manager processes packets, leading to head-of-line blocking. Head-of-line blocking may occur, for example, when a burst of packets for a first multicast session to one group of egress ports arrives before a burst of packets of a second multicast session to a different group of egress ports. If the egress ports corresponding to the first multicast session are congested, it may take several service/processing periods before the packets of the first multicast session are replicated and sent, even though the egress ports for the second multicast session may be fairly uncongested. In addition, since the traffic manager processes the multicast queues at a rate faster than the egress ports consume packets, the traffic manager may pick the packets of the first session in sequence and then wait to copy these packets to the already-congested egress ports. Thus, the packets of the second multicast session might be delayed or even dropped/blocked (when, e.g., a delay threshold is exceeded) while the traffic manager processes the burst of packets for the first multicast session.

As would be apparent to one skilled in the art, the methods of the prior art provide varying levels of system performance, but do not provide deterministic operation (e.g., bounded operation in terms of latency or stability). In addition, systems designed according to the methods of the prior art may depend upon various assumptions as to the characteristics of arrival traffic, which may lead to poor system performance when the assumptions are in error or if traffic-pattern characteristics change with time. The methods of the prior art also might not adequately provide for intelligent buffer management, or allow for QoS guarantees.

SUMMARY OF THE INVENTION

In accordance with embodiments of the present invention, a communications switch or router employs a replication server to perform batch processing of multicast connections. The replication server performs three distinct forms of processing using staging queues: packet arrival processing, packet replication processing, and per-interface transmission processing. Packet arrival processing queues arriving packets of one or more multicast sessions in per-session queues, adds each new multicast session to a replication set, and assigns a count equivalent to the fan-out of the multicast session to each packet. Packet replication processing assigns a descriptor to packets of each session in the replication set, and copies the descriptor to each interface descriptor queue. For each interface descriptor queue, per-interface transmission processing examines a descriptor in the interface descriptor queue, copies the corresponding packets for transmission by the interface, adjusts the assigned counter as each corresponding packet is copied, and clears the packet stored in the switch based on the adjusted counter (e.g., when the count reaches zero).

In accordance with an exemplary embodiment of the present invention, packets of one or more multicast sessions are routed between ingress ports and egress ports of a switch. Packets are routed by queuing i) each arriving packet in a corresponding session queue, and ii) an identifer for each new multicast session to a list-of-sessions queue. A descriptor associated with one or more packets of each multicast session is queued in the list-of-sessions queue to one or more interface descriptor queues associated with one or more egress ports of the switch. For each non-empty interface descriptor queue, one descriptor of the non-empty interface descriptor queue is selected; and, for each non-empty interface descriptor queue, one or more packets associated with the selected descriptor in the non-empty interface queue are transmitted to the corresponding egress port.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
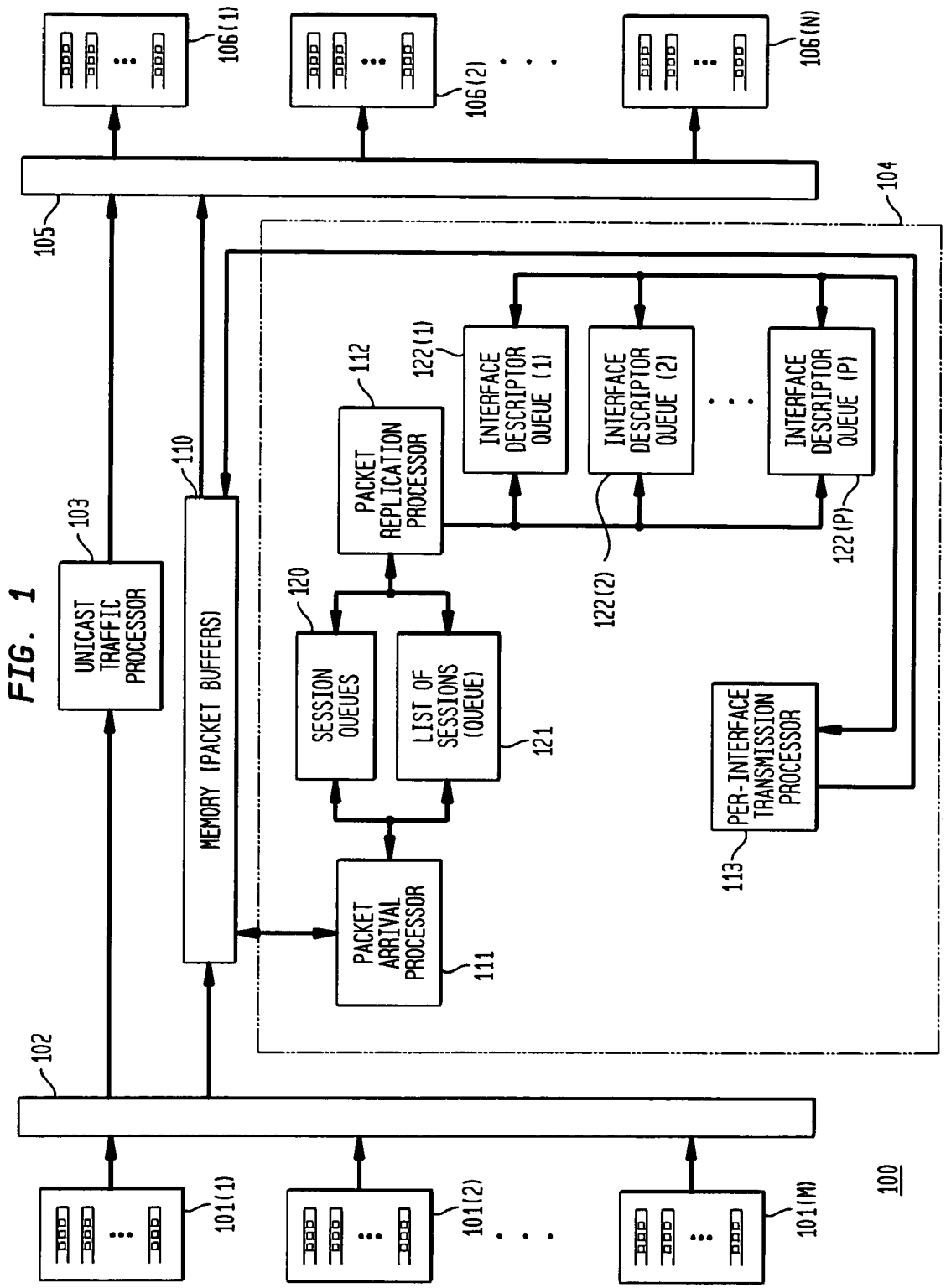
FIG. 1 shows a block diagram of a switch having a replication server operating in accordance with an exemplary embodiment of the present invention.

FIG. 1 shows a switch 100 having a replication server 104 operating in accordance with an exemplary embodiment of the present invention. Switch 100 comprises ingress ports 101(1)-101(M), input switch fabric interface 102, memory (packet buffers) 110, unicast traffic server 103, replication server 104, output switch fabric interface 105, and egress ports 106(1)-106(N) (M and N positive integers). Switch 100 may be an edge switch or edge router processing, for example, packetized data of one or more connections (or "traffic") through switch 100.

Packets are received at ingress ports 101(1)-101(M) and are routed to either unicast traffic server 103 or replication server 104 by input switch fabric interface 102. A packet is routed to unicast traffic server 103 if the packet is to be routed to one egress port, and a packet is routed to replication server 104 if the packet is part of a multicast session and is to be copied to two or more egress ports. As shown in FIG. 1, packets of multicast sessions (or "multicast packets") routed to replication server 104 are received in memory (packet buffers) 110. Unicast packets may similarly be received in a memory (either memory 110 if it is a common memory or a separate unicast memory not shown in FIG. 1) for processing by unicast server 103. As would be apparent to one skilled in the art, either queues implemented as buffers or virtual queues implemented with link-lists may be employed for queuing.

Packets from unicast traffic server 103 and replication server 104 are provided to output switch fabric interface 105 and distributed to egress ports 106(1)-106(N).

In general, ingress ports 101(1)-101(M) and egress ports 106(1)-106(N) might be included in line cards of switch 100, and those line cards might provide connectivity to external networks (e.g., backbone packet networks and access networks). While the present invention is described for, for example, a switch as employed in asynchronous transfer mode (ATM) networks, the present invention is not so limited and may be extended to other types of switches or routers of a packet network.

Replication server 104 comprises packet arrival processor 111, packet replication processor 112, and per-interface transmission processor 113. Replication server 104 further comprises session queues 120, list-of-sessions queue 121, and interface descriptor queues 122(1)-122(P) (P a positive integer). Replication server 104 implements a method of batch multicasting as described subsequently with respect to FIGS. 2-5.

For batch multicasting, the replication server (either as replication server 104 in FIG. 1 or a processor implementing the state diagram of FIG. 2, described subsequently) employs a staging queue structure in which multicast packets are queued on a per-session basis. In other words, each session is assigned a specific session queue to which packets of the session are enqueued, and the session is identified with a session descriptor placed in the list-of-sessions queue. Session queues are desirably virtual queues implemented with linked-lists. For each multicast session, the replication server maintains a list of interfaces, or egress ports, to which packets of a given multicast session are to be copied. In addition, the replication server maintains, for each session in the session queue, two pointers: one pointer pointing to the head and the other pointer pointing to the tail of the packets for the multicast session that is in switch memory and waiting to be copied to the corresponding egress ports.

Consequently, replication server 104 (FIG. 1) includes session queues 120, list-of-sessions queue 121, and per-interface descriptor queues 122(1)-122(P). Session queue 120 stores packet pointers of each session received at the switch, thereby "queuing" packets of the session. List-of-sessions queue 121 stores identifiers for each multicast session received at the switch and waiting to be replicated. The entries of list-of-sessions queue 121 comprise a "replication set", and the replication set in list-of-sessions queue 121 is arranged in a specific order (e.g., first-in, first-out). One or more per-interface descriptor queues 122(1)-122(P) store identifiers, termed descriptors, for packets for replication at the corresponding egress port (e.g., corresponding one of egress ports 106(1)-106(N)), thereby queuing packets on a per-output port basis.

Figure 2:
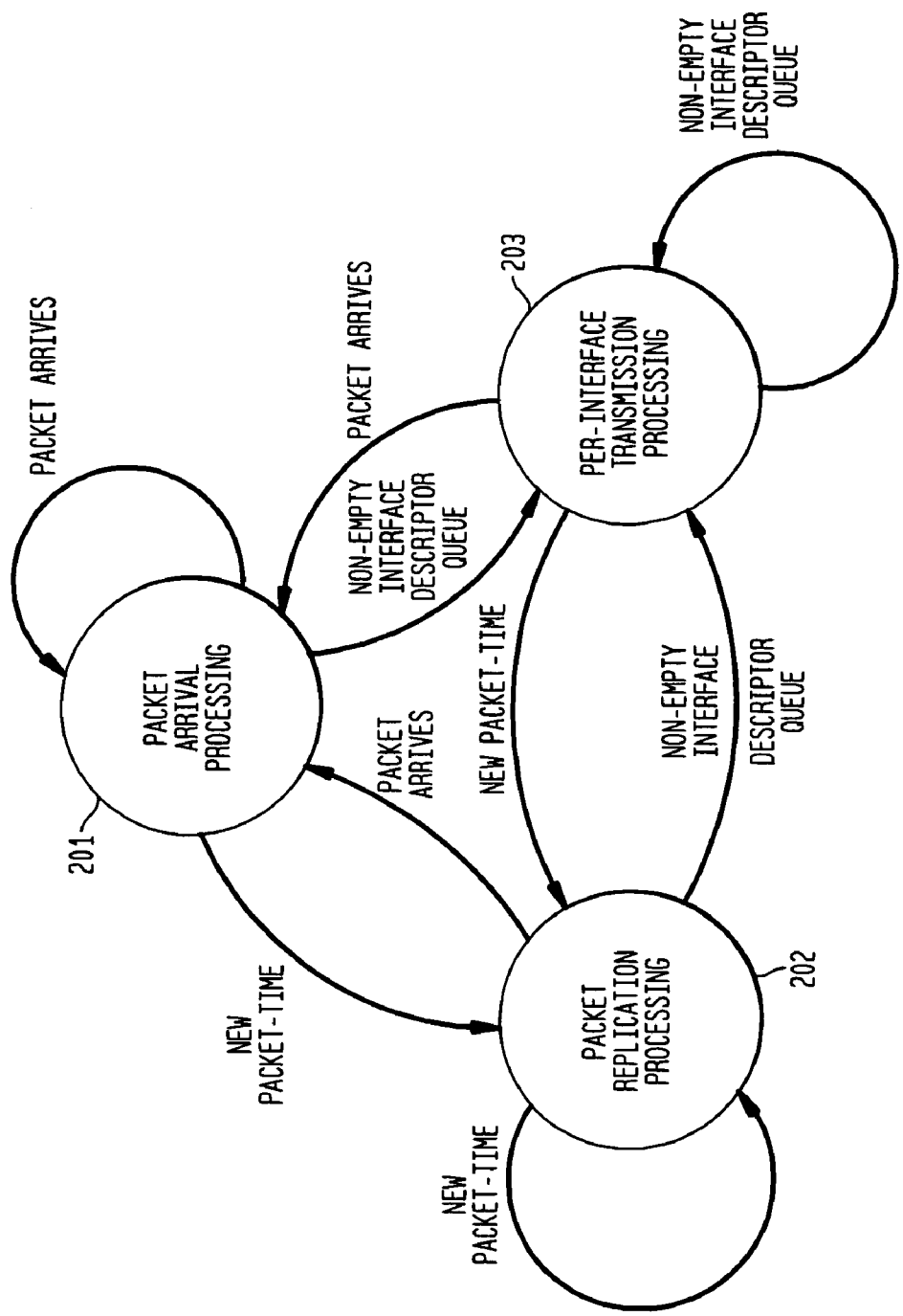
FIG. 2 shows an exemplary state diagram for batch multicasting as may be employed by the replication server of FIG. 1.

FIG. 2 shows an exemplary state diagram 200 for batch multicasting as may be employed when a processor implements the functions of replication server 104 shown in FIG. 1. State diagram 200 shows packet arrival processing state 201 (similar to processing by packet arrival processor 111), packet replication processing state 202 (similar to processing by packet replication processor 112), and per-interface transmission processing state 203 (similar to processing by per-interface transmission processor 113). For FIG. 2, each of the states 210, 202, and 203 corresponds to a particular state of processing by the replication server, and each arrow into or out of a state represents the event that may trigger the processing of a given state. Depending on the implementation, the state diagram of FIG. 2 may illustrate the sharing of processing resources for a single processor, or the state diagram may illustrate processing by separate processors.

Packet arrival processing state 201 is entered upon receiving a packet. When a packet of a multicast session arrives at, for example, the ingress port of a switch, the packet is placed at the end of a session queue that corresponds to the multicast session. If the packet is the first packet of the multicast session, then the multicast session is added to the replication set (such as the session descriptor added to list-of-sessions queue 121 of FIG. 1). A variable reference count associated with the packet is set to the fan-out of the multicast session, which fan-out corresponds to the number of interfaces (egress ports) to which the packet is to be copied.

Packet replication processing state 202 is entered each new "packet-time." Packet-time may be defined as the time interval that, for example, the replication server takes to copy a minimum-sized packet from the switching fabric of the switch. However, other time interval definitions may be employed for packet time. In general, packet time may be a time interval set for a predefined amount of processing by the replication server. During packet replication processing state 202, replication server 104 processes a multicast session of the replication set one at a time in, for example, round-robin order. One skilled in the art may extend the packet replication processing state 202 to other forms of service, such as weighted round-robin order, weighted fair queuing, or priority scheduling.

For the described embodiment, one "copy" operation is performed each packet-time, but each copy may include one or more copied packets from the session queue. To copy packets to each interface, a virtual descriptor is created for packet(s) of a selected session in the session queue and in the replication set. This descriptor points to the packets for this selected session that have arrived at the switch up to the present packet-time. The descriptor is added, one at a time, to each per-interface descriptor queue to which the packets of the session are to be copied.

Since packets may arrive at any time during processing by the batch multicasting method, packet replication processing state 202 treats newly arrived packets of a session that is currently being processed as packets of a new multicast session. When the operation of packet replication processing state 202 starts, complete replication of the first session in the replication set may take several packet-times (as determined by the fan-out of the session). During this period, multiple multicast packets of this or other multicast sessions may arrive, which are enqueued in corresponding session queues. When packet replication processing state 202 starts processing the next multicast session in the replication set, the processing typically replicates multiple packets, instead of just a single packet.

Per-interface transmission processing state 203 is entered for processing each one of the interface descriptor queues, and this state 203 is entered every packet time if at least one interface descriptor queue is not empty. Each descriptor in the interface descriptor queue is examined and the packets pointed to by the descriptor are copied out to the egress port, one at a time. Note that descriptors of the descriptor queue may be examined, or serviced, using round-robin, weighted round-robin, or other similar methods of service known in the art. Per-interface transmission processing state 203 decrements the corresponding reference count of a session's descriptor as each packet of the session is copied to an egress port. When the reference count reaches zero, the replication server has finished copying the packet to all egress ports. At that time, the corresponding packet in memory is released.

Figure 3:
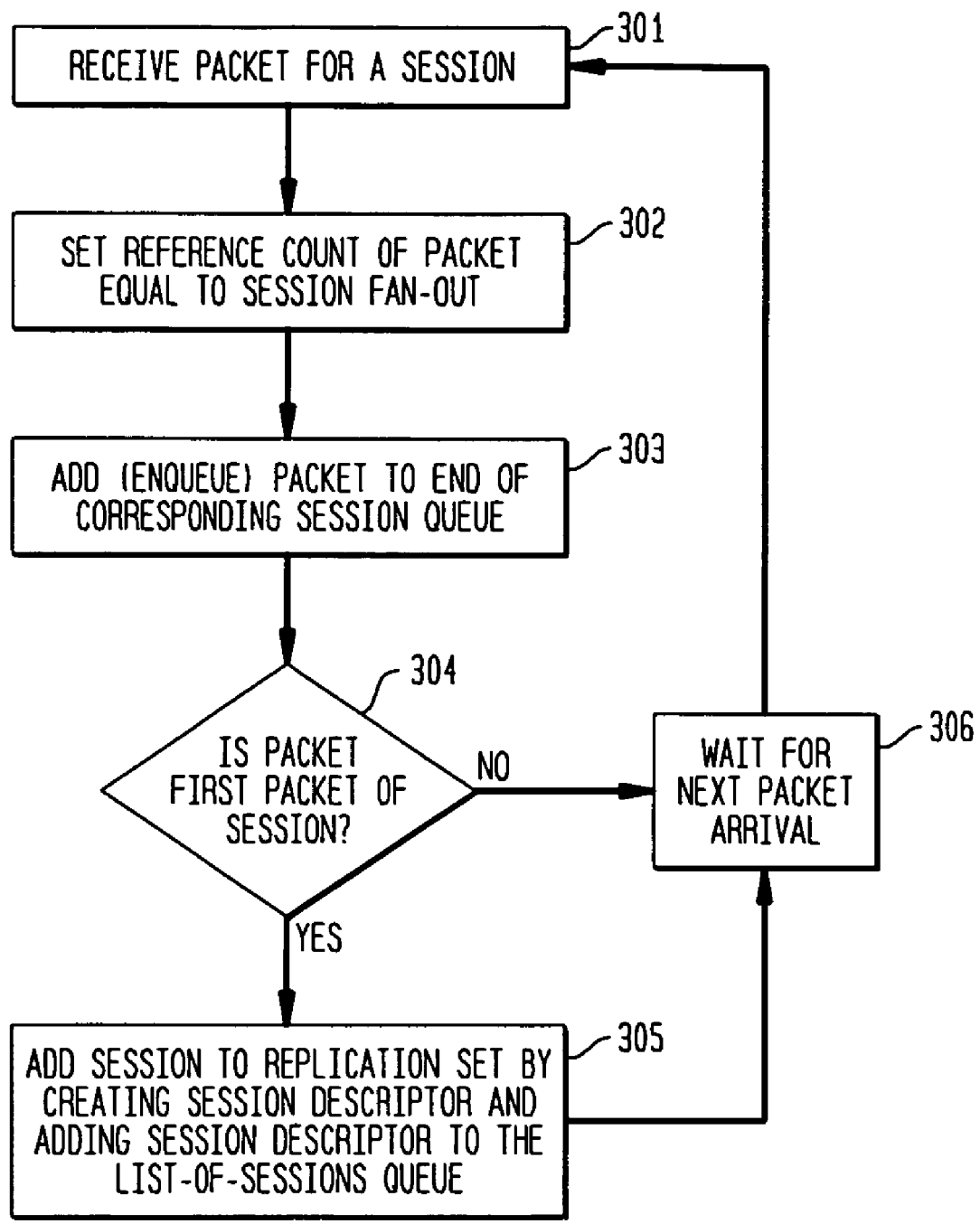
FIG. 3 shows a flow diagram for an exemplary method of packet arrival processing for batch multicasting of FIG. 2.

FIG. 3 shows an exemplary method of packet arrival processing as may be employed for packet arrival processor 111 of FIG. 1, or state 201 of FIG. 2. At step 301, a packet of a multicast session is received at an ingress port of the switch. At step 302, the value of the reference count associated with the packet is set to the fan-out value of the multicast session. The fan-out value may be generated, for example, by the replication server through an examination of the destination addresses for the packet. Alternatively, the fan-out value may be a provisioned value entered along with the provisioning for the multicast connection.

At step 303, the packet is enqueued at the end of the session queue corresponding to the multicast session that the packet belongs to. At step 304, a test determines whether the packet in the corresponding session queue is the first packet of the session. If the test of step 304 determines that the packet is the first packet of the session, then the method advances to step 305 to add the new session to the replication set in the list-of-sessions queue. The new session is added to the replication set by creating a session descriptor (an identification value for the particular session) and adding the session descriptor to the tail of the list-of-sessions queue. From step 305, the method advances to step 306 to wait for the next packet, which might not necessarily be from the same session.

If the test of step 304 determines that the packet is not the first packet of the session, the method advances to step 306 to wait for the next packet.

Figure 4:
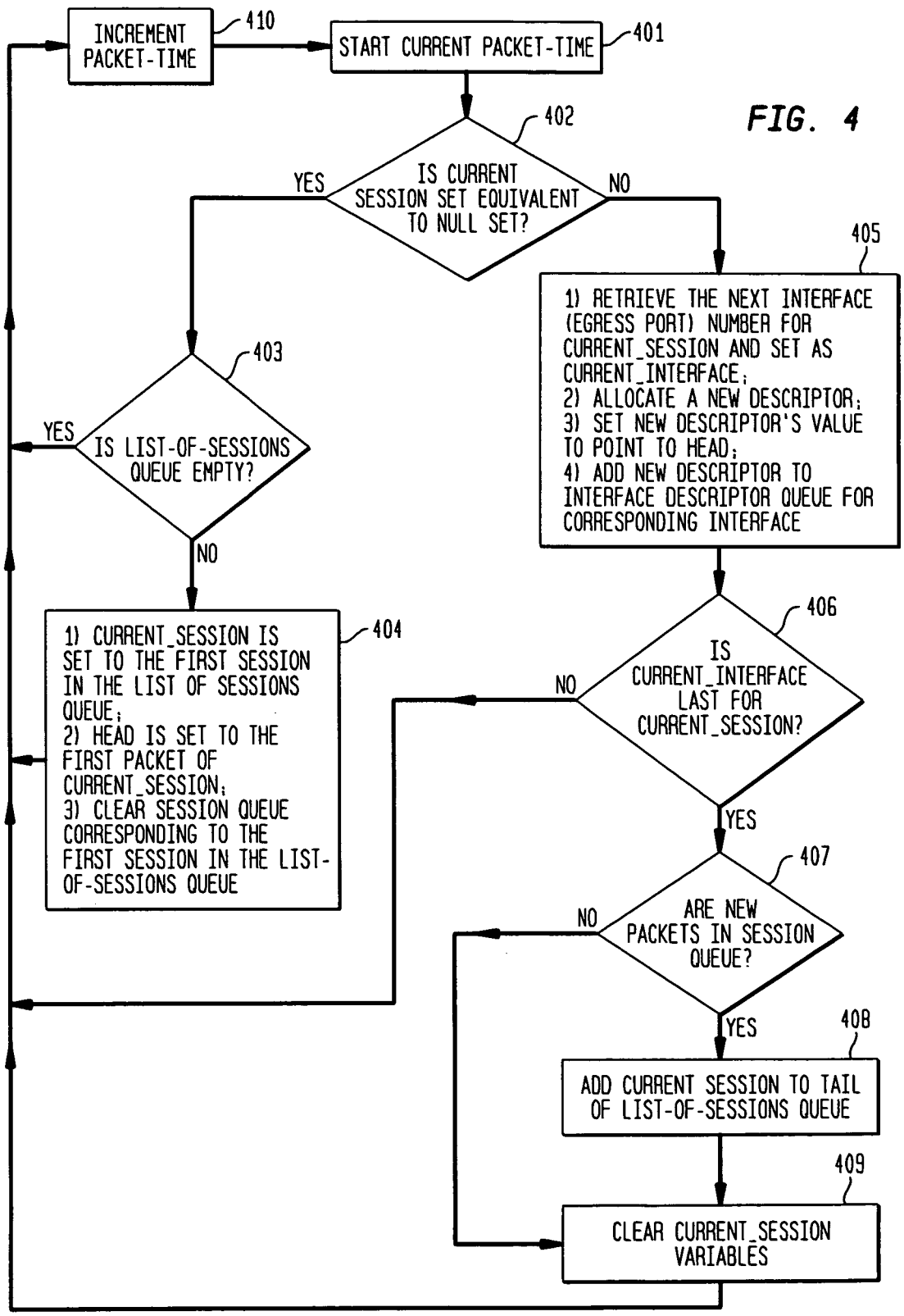
FIG. 4 shows a flow diagram for an exemplary method of multicast packet replication for batch multicasting of FIG. 2.

FIG. 4 shows an exemplary method of packet replication as may be employed by packet replication processor 112 of FIG. 1 or state 202 of FIG. 2. The exemplary method processes one session of the session queue at a time in round-robin order. At step 401, the current "packet-time" starts, starting the batch multicasting replication process.

At step 402, a test determines whether the algorithm variable "Current_Session" is equivalent to the null set, indicating that no sessions are currently identified for copying. If the test of step 402 determines that Current_Session is equivalent to the null set, the method advances to step 403. At step 403, a test determines whether the list-of-sessions queue (i.e., the replication set) is empty, indicating that no multicast sessions are currently queued in the session queues by the replication server. If the test of step 403 determines that the list-of-sessions queue is empty, the method advances to step 410 to wait for the next packet-time.

If the test of step 403 determines that the list-of-sessions queue is not empty, then, at step 404, the method sets Current_Session to the first session in the list-of-sessions queue, in effect selecting the next session in the list of sessions queue for replication processing. In addition, at step 404, the head pointer is set to point to the first packet of Current_Session (i.e., the first packet of the next session in the list-of-sessions queue). Then the session queue of Current_Session (i.e., the queue corresponding to the first session in the list-of-sessions queue) is cleared. Such clearing does not "clear" packets from the packet buffers, but rather frees up the pointer that corresponds to this session currently used by the session at the head of the list-of-sessions queue for another multicast session. From step 404, the method advances to step 410 to wait for the next packet-time.

If the test of step 402 determines that Current_Session is not equivalent to the null set, then the method advances to step 405. At step 405, the method prepares to copy the packet to an interface (e.g., egress port), and the method maintains a list of interfaces (egress ports identified by interface number) to which the packets of each multicast session are copied. First, the variable Current_Interface is set to the next interface number (i.e., next egress port identifier) for Current_Session. Second, a new descriptor is allocated to the Current_Session for Current_Interface, which new descriptor identifies a set of packets in memory for Current_Session. Third, the new descriptor's value is adjusted to point to the head of the queue for Current_Session (i.e., adjusted to point to the first packet in the queue of Current_Session). Fourth, the new descriptor is added to the interface descriptor queue of the egress port corresponding to Current_Interface. From step 405, the method advances to step 406.

At step 406, a test determines whether the value of Current_Interface corresponds to the last interface number for Current_Session. If the test of step 406 determines that the value of Current_Interface does not correspond to the last interface number for Current_Session, then the method advances to step 410 since there are more egress ports left to which the packets of Current_Session must be copied. If the test of step 406 determines that the value of Current_Interface does correspond to the last interface number for Current_Session, then the method advances to step 407.

At step 407, a test determines if new packets have arrived for Current_Session. If the test of step 407 determines that no new packets have arrived for Current_Session, then the method advances to step 409 to clear Current_Session (to null set), Current_Interface, and any other variables or pointers employed for generating descriptors for Current_Session. If new packets were to arrive subsequently, then the method of FIG. 3, for example, may create allocate a new session queue and add the multicast session back as a new session to the tail of the list-of-sessions queue. From step 409, the method advances to step 410.

If the test of step 407 determines that new packets have arrived for Current_Session, then the method advances to step 408. Since new packets may arrive at any time during the process, new packets may have arrived for the multicast session corresponding to Current_Session while the method of FIG. 4 is executing various steps. As described above, when step 404 sets Current_Session, this multicast session is then removed from the list-of-sessions queue and the corresponding session queue released. However, the method of FIG. 3 might not have identified these packets as the beginning of a "new" session and added them to a new session queue (with a new session descriptor added to the list-of-sessions queue). Consequently, at step 408, the session corresponding to Current_Session is enqueued at the tail of the list-of-sessions queue (and the packets held in a corresponding session queue). From step 408, the method advances to step 409.

Figure 5:
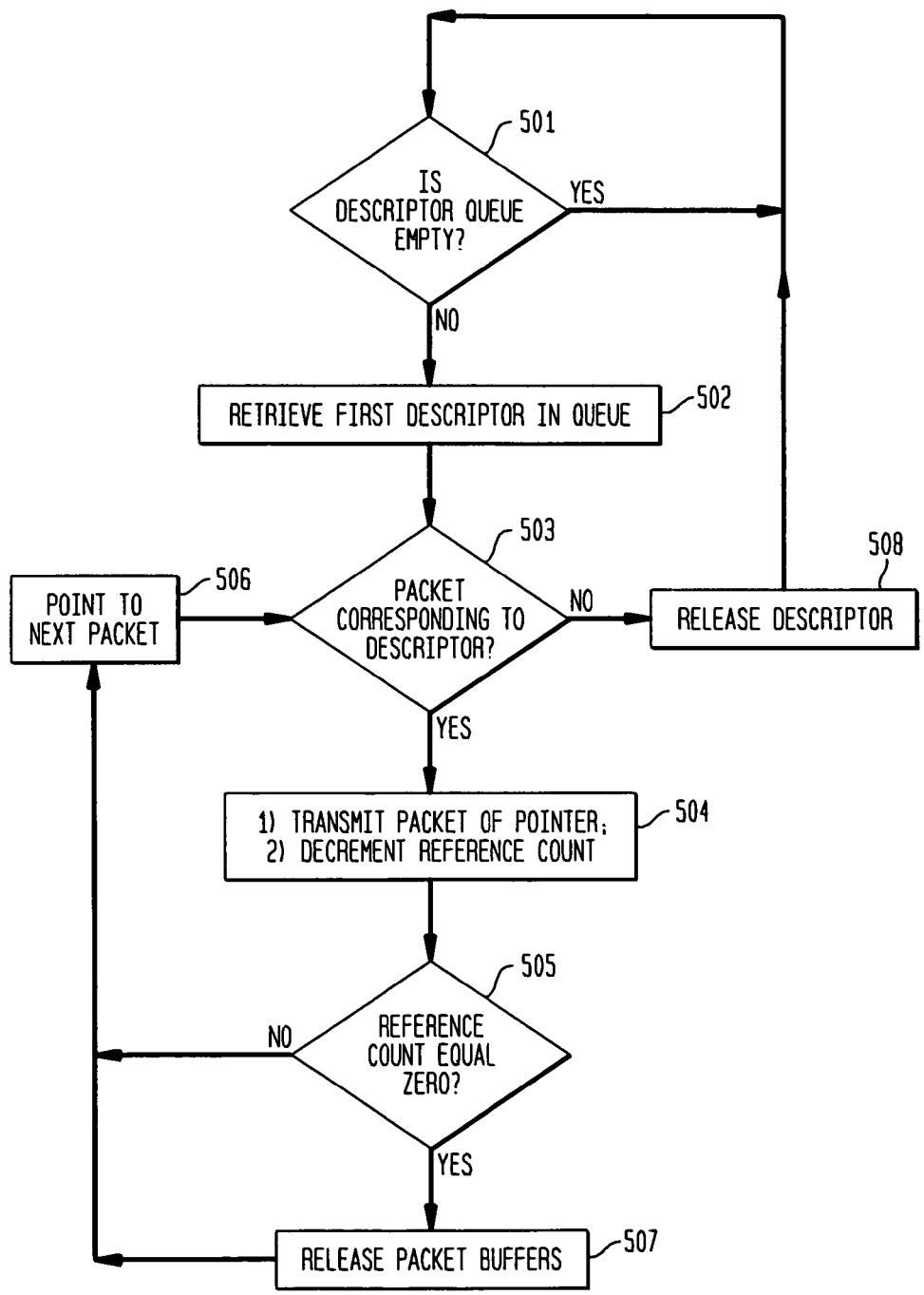
FIG. 5 shows a flow diagram for an exemplary method of transmission processing for batch multicasting of FIG. 2.

FIG. 5 shows an exemplary method of per-interface transmission processing employed by per-interface transmission processor 113 of FIG. 1 or state 203 shown in FIG. 2. The method of FIG. 5 may be employed for each egress port to process the corresponding interface descriptor queue to transmit packets of each multicast session to the egress port.

At step 501, a test determines whether the current interface descriptor queue is empty. If the test of step 501 determines that the current interface descriptor queue is empty, then the method waits until the interface descriptor queue is non-empty. If the test of step 501 determines that the interface descriptor queue is not empty, then, at step 502, the first descriptor in the interface descriptor queue is retrieved. At step 503, a test determines whether a current value of pointer points to a packet corresponding to the retrieved descriptor, in effect, seeing whether any queued packets remain to transmit for the retrieved descriptor. If the test of step 503 determines that no packet remains for the retrieved descriptor, the method advances to step 508. At step 508 the retrieved descriptor is released (i.e., the descriptor is dropped from the interface descriptor queue) since all packets corresponding to the retrieved descriptor have been copied. From step 508, the method returns to step 501.

If the test of step 503 determines that a packet remains for the retrieved descriptor, then the method advances to step 504. At step 504, a copy of the packet currently identified by the pointer is sent to, for example, the egress port, and the reference count of the packet (originally set, e.g., to the multicast session fan-out in step 302 of FIG. 3) is decremented. At step 505, a test determines whether the reference count is equal to zero. If the test of step 505 determines that the reference count is not zero, then additional copies of the packet are still to be sent to other egress ports. Consequently, the method advances to step 506 to adjust the current value of the pointer to point to the next packet (if present) of the retrieved descriptor. If the test of step 505 determines that the reference count is zero, indicating that all copies of the packet for the corresponding multicast session have been transmitted, then the method advances to step 507. At step 507, the packet buffer storing the packet (i.e., the actual memory location storing the data of the packet) is released, along with any linked-list information related to the packet. From step 507, the method advances to step 506.

Exemplary embodiments of the present invention may provide for enhanced stability. A session may be considered "backlogged" if the corresponding session queue is non-empty or the packets of the session are being replicated. If $f_i$ is the fan-out of session i, where $0 \leq i \leq K$ and K is the (integer) number of multicast sessions, then the bounded time interval $\Theta_i$ between the time session i is added to the tail of the replication server session queue and the time that the replication for session i is complete might be as given in equation (1):

$$\Theta_i = \sum_{i=1}^{K} f_i. \quad (1)$$

where equation (1) is normalized to account for fan-out copies per unit processing time. If the replication server guarantees any session i may be visited within $\Theta_i$ time after it is added to the end of the list of sessions of the replication set, the delay of any packet during replication is bounded by $\Theta_i + f_i$. Since the replication server services a session within a bounded delay period, the batch multicast method exhibits stable operation. The replication server may process sessions with a rate lower than once every packet-time and still exhibit stable operation. In addition, the replication server may be modified to visit eligible sessions with different frequency, offering varying delays at the replication server, and still exhibit stable operation.

The exemplary embodiment previously described employs a round-robin service method to service each session in the replication set, but, for some embodiments, such as those where some sessions have a much greater fan-out than other sessions, the round-robin service method might not provide fair service. However, the present invention is not limited to a round-robin service method and may be extended to a "general" replication server that maintains stable operation.

The replication server may be modeled as a general queuing server offering service to a set of queues (similar to a per-flow packet scheduler). The general queuing server services the set of queues based on the number of copies per unit time, with the normalized time needed to complete replication equal to the fan-out of the session. The capacity RC of the general replication server is defined as the number of copies per-unit time, where a copy is the function of attaching a session queue to a single interface. Again, complete replication of the session requires a number of copies equal to the fan-out of the session. A multicast packet is served once it has been copied to all interfaces, and $S_i(t_1,t_2)$ denotes the service offered to multicast packets of session i during the time interval $(t_1,t_2]$. This service $S_i(t_1,t_2)$ is equal to the number of copies for session i during the time interval $(t_1,t_2]$, which copies may correspond to one or more complete replications. As before, $f_i$ denotes the fan-out of session i and $W_i^j(t_1,t_2)$ denotes the actual number of packets that have been replicated during the time interval $(t_1,t_2]$ from session i to interface j. The number of packets that arrive for session i during the time interval $(t_1,t_2]$ is denoted $A_i(t_1,t_2)$. Session i may be guaranteed a rate of copies $\rho_i$, and the rate of complete replication is $(\rho_i/f_i)$. For the general replication server, the server is termed worst-case fair if, and only if, for any time interval $(t_1,t_2]$ during which a session i is continuously backlogged, the server may guarantee a service $S_i(t_1,t_2)$ as bounded in equation (2):

$$S_i(t_1,t_2) \geq \max((t_2-t_1)\rho_i - \Theta_i, 0), \quad (2)$$

where "max" is the mathematical operator returning the maximum value of the two arguments. The sum of the rates allocated to all sessions is desirably less than the capacity RC of the server.

Any worst-case fair replication server that maintains stability and provides a maximum delay $L_i$ to any multicast packet of session i, irrespective of the arrival traffic, as given in equation (3):

$$L_i = \frac{f_i + \Theta_i}{\rho_i} + f_i. \quad (3)$$

Since batch multicast processing is employed, the burstiness properties of the multicast sessions may be affected, which may be characterized with respect to burstiness as experienced by the transmission queues of the interfaces (egress ports). Such characterization is dependent upon the burstiness bound b(t) of the arrival traffic which, for any time interval $(t_1,t_2]$, the relation of equation (4) holds:

$$A(t_1,t_2) \leq b(t_1-t_2) \quad (4)$$

For leaky-bucket constrained traffic, $b(t_1-t_2) \leq \sigma + r_i(t_1-t_2)$, where $r_i$ is the rate of session i and $\sigma$ is the maximum burst size (in, e.g., bytes). Consequently, if the session arrival traffic is burstiness constrained, then the output of the replication server is also burstiness constrained as in equation (5):

$$W_i^j(t_1, t_2) \leq b(t_1-t_2+L_i+f_i). \quad (5)$$

For leaky-bucket constrained traffic, the output of the replication server is bounded as given in equation (6):

$$W_i^j(t_1,t_2) \leq \sigma + r_i(t_1-t_2) + r_i(L_i+f_i). \quad (6)$$

As described above, using a worst-case fair scheduling method for the general replication server, the various multicast sessions may experience a range of latencies, irrespective of the arrival traffic. This range of latencies may be bounded to the capacity RC of the replication server, as given in equation (7):

$$\sum_{i=1}^{K} \frac{\Theta_i + f_i}{D_i - f_i} \leq RC, \quad (7)$$

where $D_i$ is the latency requirement of multicast session i, which may be set at the time of provisioning of the multicast connection.

The method of batch multicasting packets in accordance with one or more exemplary embodiments of the present invention may provide one or more of the following advantages when implemented in, for example, an edge switch or edge router. First, the method of batch multicasting simplifies the process of replicating packets, while allowing for an arbitrary fan-out without memory speed-up. Second, the method provides for finite bounds on memory requirements. Third, the method provides for deterministic bounds on the latency of multicast connections during the process of replicating packets. Fourth, the method supports layered multicasting, where different ingress ports receive a different number of layers of a multicast application, depending on the available bandwidth, without using multiple multicast groups (i.e., without defining multiple multicast sessions for the same application.

As would be apparent to one skilled in the art, the various functions of switching may be implemented with circuit elements or may also be implemented in the digital domain as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of routing packets of one or more multicast sessions between ingress ports and egress ports of a switch, the method comprising the steps of:
   (a) queuing i) each arriving packet in a corresponding session queue, and ii) an identifier for each new multicast session to a list-of-sessions queue;
   (b) queuing a descriptor associated with one or more packets of each multicast session in the list-of-sessions queue to a plurality of interface descriptor queues, each interface descriptor queue associated with only one corresponding egress port of the switch;
   (c) selecting, for each of a plurality of non-empty interface descriptor queues, one descriptor of the non-empty interface descriptor queue;
   (d) transmitting, for each of the plurality of non-empty interface descriptor queues, one or more packets associated with the selected descriptor in the non-empty interface descriptor queue to the corresponding egress port, and
   (e) guaranteeing a bounded time interval between the arrival of an arriving packet at a corresponding session queue and completion of the transmission to the corresponding egress ports of all of the one or more packets corresponding to the arriving packet, wherein:
   the bounded time interval is based on the number of multicast sessions and the fan-out of each of the multicast sessions;
   the fan-out is defined as the number of egress ports for which packets of a multicast session are to be replicated; and
   the fan-out is less than the total number of egress ports of the switch.

2. The invention of claim 1, further comprising the steps of:
   (f) assigning a reference count equivalent to the fan-out of the corresponding multicast session to each arriving packet; and
   (g) adjusting the reference count as the corresponding packet is transmitted to the corresponding egress port.

3. The invention of claim 2, further comprising the steps of:
   (h) repeating steps (c), (d), and (g); and
   (i) clearing the packet in the switch based on the adjusted reference count.

4. The invention of claim 3, wherein step (i) clears the packet when the adjusted reference count is zero.

5. The invention of claim 1, further comprising the step of repeating steps (a) through (d) as packets arrive at the switch.

6. The invention of claim 1, wherein, for step (b), each descriptor for each session is queued in the plurality of interface descriptor queues in accordance with a round-robin or weighted round-robin scheduling method.

7. The invention of claim 1, wherein step (c) selects each descriptor of each interface descriptor queue in accordance with a predefined service method.

8. The invention of claim 1, wherein the bounded time interval is based on a summation of the fan-out of each corresponding multicast session over all of the multicast sessions.

9. Apparatus for routing packets of one or more multicast sessions between ingress ports and egress ports of a switch, the apparatus comprising:
   a packet arrival processor adapted to queue i) each arriving packet in a corresponding session queue, and ii) an identifier for each new multicast session to a list-of-sessions queue;
   a packet replication processor adapted to queue a descriptor associated with one or more packets of each multicast session in the list-of-sessions queue to a plurality of interface descriptor queues, each interface descriptor queue associated with only one corresponding egress port of the switch; and
   a per-interface transmission processor adapted to:
   1) select, for each of a plurality of non-empty interface descriptor queues, one descriptor of the non-empty interface descriptor queue; and 2) transmit, for each of the plurality of non-empty interface descriptor queues, one or more packets associated with the selected descriptor in the non-empty interface descriptor queue to the corresponding egress port;

wherein:

the apparatus is adapted to guarantee a bounded time interval between the arrival of an arriving packet at a corresponding session queue and completion of the transmission to the corresponding egress ports of all of the one or more packets corresponding to the arriving packet;

the bounded time interval is based on the number of multicast sessions and the fan-out of each of the multicast sessions;

the fan-out is defined as the number of egress ports for which packets of a multicast session are to be replicated; and the fan-out is less than the total number of egress ports of the switch.

10. The invention of claim 9, wherein:

the packet arrival processor is adapted to assign a reference count equivalent to the fan-out of the corresponding multicast session to each arriving packet; and the per-interface transmission processor is adapted to adjust the reference count as the corresponding packet is transmitted to the corresponding egress port.

11. The invention of claim 10, wherein the per-interface transmission processor is adapted to clear the packet in the switch based on the adjusted reference count.

12. The invention of claim 9, wherein each descriptor for each session is queued in the plurality of interface descriptor queues in accordance with a round-robin or weighted round-robin scheduling method.

13. The invention of claim 9, wherein the bounded time interval is based on a summation of the fan-out of each corresponding multicast session over all of the multicast sessions.

14. A computer-readable storage medium having stored thereon a plurality of computer-executable instructions, the plurality of instructions including instructions which, when executed by a computer, cause the processor to implement a method for routing packets of one or more multicast sessions between ingress ports and egress ports of a switch, the method comprising the steps of:

(a) queuing i) each arriving packet in a corresponding session queue, and ii) an identifier for each new multicast session to a list-of-sessions queue;

(b) queuing a descriptor associated with one or more packets of each multicast session in the list-of-sessions queue to a plurality of interface descriptor queues, each interface descriptor queue associated with only one corresponding egress port of the switch;

(c) selecting, for each of a plurality of non-empty interface descriptor queues, one descriptor of the non-empty interface descriptor queue;

(d) transmitting, for each of the plurality of non-empty interface descriptor queues, one or more packets associated with the selected descriptor in the non-empty interface descriptor queue to the corresponding egress port; and (e) guaranteeing a bounded time interval between the arrival of an arriving packet at a corresponding session queue and completion of the transmission to the corresponding egress ports of all of the one or more packets corresponding to the arriving packet, wherein:

the bounded time interval is based on the number of multicast sessions and the fan-out of each of the multicast sessions;

the fan-out is defined as the number of egress ports for which packets of a multicast session are to be replicated; and the fan-out is less than the total number of egress ports of the switch.

15. The invention of claim 14, wherein, for step (b), each descriptor for each session is queued in the plurality of interface descriptor queues in accordance with a round-robin or weighted round-robin scheduling method.

16. The invention of claim 14, wherein the bounded time interval is based on a summation of the fan-out of each corresponding multicast session over all of the multicast sessions.

* * * * *

UNITED STATES PATENT AND TRADEMARK OFFICE
CERTIFICATE OF CORRECTION

PATENT NO. : 7,649,882 B2 Page 1 of 1
APPLICATION NO. : 10/402589
DATED : January 19, 2010
INVENTOR(S) : Dimitrios Stiliadis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this

Twenty-eighth Day of December, 2010

David J. Kappos
*Director of the United States Patent and Trademark Office*